Dec. 23, 1952  J. E. SPARKS  2,622,471
OIL TESTING DEVICE
Filed July 8, 1950

Inventor: Joseph Erwin Sparks

By [signature]

Attorney

Patented Dec. 23, 1952

2,622,471

UNITED STATES PATENT OFFICE 2,622,471

OIL TESTING DEVICE

Joseph Erwin Sparks, Terre Haute, Ind.

Application July 8, 1950, Serial No. 172,670

5 Claims. (Cl. 88—14)

This invention is a device through the medium of which the condition of the oil in the crank case of an internal combustion engine may, by a garage or station attendant, be shown to a customer in a practical and visible manner.

It is known that when lubricating oil is placed in modern automotive engines it has certain beneficial effects which gradually deteriorate with use. Upon continued use of the lubricating oil said oil gradually loses its lubricating qualities until its retention in the crank case becomes deleterious rather than beneficial. In such cases foreign matter become suspended in the oil and the oil itself undergoes chemical degradation, such occurrences usually resulting in discoloration and lack of lubricating qualities.

It is well-known that the characteristics of different engines are not identical and the length of time required to bring about the degradation and discoloration will not be the same in the case of all engines. The length of time that some automotive engines can safely operate may correspond more or less to two or three thousand miles with the usual automobile whereas other types of engines utilized in automobiles cannot be operated safely over a greater distance than about 500 miles with the same oil. Therefore no hard and fast rule can be made that will apply to all engines and indicate to every operator the point at which the lubricating oil should be changed.

The art has long sought simple, economical, and effective means for determining and visually demonstrating the conditions of the lubricating oil in automotive engines. For example, U. S. Patent 1,854,143 discloses a device whereby lubricating oil is placed on a suitable surface and its appearance compared with variously colored indicia previously determined to illustrate the condition of lubricating oil at various stages of use in an automotive engine. Another method used for testing lubricating oil is that disclosed in U. S. Patents 2,026,267 and 2,133,544 wherein the oil itself is visually examined against a light source.

I have discovered a means whereby the operator of a gasoline filling station or garage attendant may quickly and easily place before the eyes of the automobile operator a sample of oil actually removed from the crank case of his car. My invention is simple in operation, convenient to handle, and requires very little time and effort in use. To better check the oil in question I have provided a standard for comparison whereby both new and used oils may be seen under similar conditions.

My invention, in general, comprises a sheet of bibulous material with indicia disposed on one side thereof. When a few drops of new lubricating oil are placed on the bibulous material on the side opposite the indicia, the sheet is rendered partially transparent. If the sheet is held between the eye and a source of light, with the indicia on the side away from the eye, the indicia becomes visible through the sheet. When lubricating oil which has been partially deteriorated by use in the crank case of an automobile is placed on the bibulous material, the printed matter can be seen through the sheet, but not so plainly as when the oil is new. When deteriorated and discolored lubricating oil, i. e. lubricating oil which has lost its effectiveness and should be replaced with new oil, is placed on the bibulous sheet, the sheet is not rendered transparent and the printed material cannot be seen through the sheet. In a preferred form of my invention, guide means are provided on the side of the bibulous sheet opposite the indicia to indicate the point on the bibulous sheet at which the oil being tested should be supplied in order to insure that the oil is placed on the sheet directly opposite the indicia.

The invention is illustrated by the accompanying drawing, in which.

Figure 1:
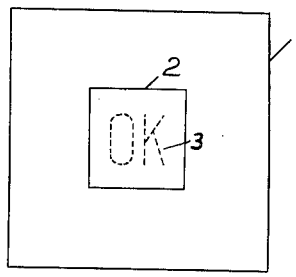
Fig. 1 is a front view of my new lubricating oil tester.
Figure 2:
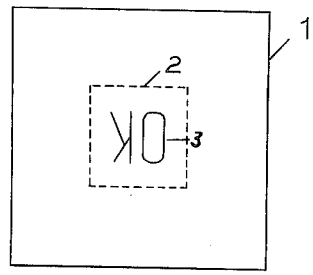
Fig. 2 is a rear view of my oil testing device.
Figure 3:
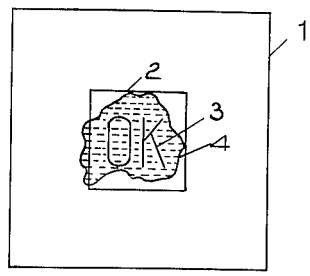
Fig. 3 is a front view of the device indicating its appearance after new oil has been tested thereon.
Figure 4:
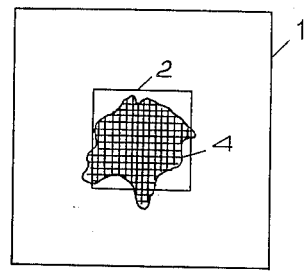
Fig. 4 is a front view showing its appearance after deteriorated oil has been placed thereon.

Referring to the drawings in more detail, the invention as shown therein comprises a sheet of bibulous material 1, with indicia 3 disposed on one side thereof. On the opposite side of the sheet from the indicia is a guide means 2 consisting of a printed rectangle. If projected through the sheet of bibulous material the indicia would appear at about the center of the rectangle. In Figure 3 is shown the results of placing a few drops of new lubricating oil within the guide outline, the oil being absorbed by the bibulous sheet and creating a rough pattern 4. When the form of my invention illustrated by Figure 3 is held between a source of light and the eye, the indicia, which is disposed on the side of the sheet away from the eye and toward the source of light, becomes visible. Thus the operator of a motor vehicle can observe the indicia through the sheet of bibulous material indicating that the oil placed thereon is in good condition and does not require changing. In Figure 4 is shown the results of placing deteriorated and discolored lubricating oil on one form of my invention. The pattern 4 made by such oil does not render the bibulous material transparent and the indicia cannot be seen by an observer when the device is held between the eye and a source of light.

The material used for constructing the article comprising my invention can be any bibulous or absorbent material having the property of absorbing lubricating oil and being rendered at least partially transparent by such absorption of new oil. While I do not wish to be limited to any particular material of construction, I prefer to construct my oil tester from blotting paper. Not all blotting papers are operative in my invention, however, and the material to be used constitutes a critical feature of my invention. In the paper industry blotting paper is supplied in various weights, determined by the weight of 500 sheets, each sheet measuring 19 inches by 24 inches. Thus if 500 sheets measuring 19 inches by 24 inches weigh 100 pounds, the blotting paper is referred to as 100 pound blotter stock. If the same number of sheets having the same dimensions weigh 140 pounds, this blotter stock is referred to as 140 pound. I have found that in my invention any blotter stock between 100 pounds and 140 pounds is operative. Lighter blotting stocks, e. g. 80 pounds, are inoperative in my invention because the indicia can be seen through the paper whether or not oil has been placed thereon. Blotter stock heavier than 140 pounds is inoperative because it is not rendered transparent even by new oil. I prefer to use 100, 120 and 140 pound blotter stocks.

The indicia which is printed on the bibulous material can be any numerals, letters, or symbols. The size of the indicia is not critical so long as it can be observed by the human eye. The indicia can be impressed on the bibulous material, or preferably it can be printed in any bright color such as red, or in black. As an alternative, the entire bibulous sheet can be colored with the indicia being left as uncolored space. Guide means should be provided on the side of the sheet opposite the indicia to indicate to the operator where the oil sample should be placed thereon. This guide means can be in the form of a printed circle, rectangle, arrow or series of arrows, or any other appropriate means whereby the point opposite the indicia is indicated.

In general, the operation of my new testing device has already been indicated. It is used principally to make a comparison between used oil and clean, unused oil. The operator has only to remove the bayonet gauge from the engine and touch the end thereof to the bibulous material at a point approximately opposite the indicia, as indicated by the guide means.

It is obvious that various modifications may be made in the manufacture of the oil testing device without parting from the scope of the invention, and it is intended that all such variants shall be regarded as a part of the invention, as set forth in the following claims.

I claim:

1. A lubricating oil testing device which comprises a sheet of bibulous material with indicia printed on one side thereof and guide means printed on the other side thereof, said guide means indicating a point on the bibulous material opposite the point at which the indicia is located.

2. A lubricating oil testing device which comprises a sheet of blotting paper with indicia on one side thereof and guide means disposed on the side opposite the indicia, said guide means indicating an area on the blotting paper opposite the indicia, and said blotting paper weighing between 100 and 140 pounds per 500 sheets measuring 19 inches by 24 inches.

3. A lubricating oil testing device which comprises a sheet of blotting paper with indicia printed on one side thereof and guide means printed on the other side thereof, said guide means indicating an area on the blotting paper opposite the indicia, and said blotting paper weighing between 100 and 140 pounds per 500 sheets measuring 19 inches by 24 inches.

4. The device of claim 3 wherein the guide means is a printed rectangle.

5. The device of claim 3 wherein the guide means is a printed circle.

JOSEPH ERWIN SPARKS.

REFERENCES CITED

The following references are of record in the file of this patent:

UNITED STATES PATENTS

| Number | Name | Date |
| --- | --- | --- |
| 672,184 | Cushing | Apr. 16, 1901 |
| 1,416,863 | Parker | May 23, 1922 |
| 2,087,714 | Wiles | July 20, 1937 |
| 2,176,618 | Wilson | Oct. 17, 1939 |
| 2,245,557 | Franzman | June 17, 1941 |
| 2,253,356 | Akker | Aug. 19, 1941 |
| 2,302,224 | Jones | Nov. 17, 1942 |